(12) United States Patent
Chen et al.

(10) Patent No.: US 8,243,474 B2
(45) Date of Patent: Aug. 14, 2012

(54) CONTROL CIRCUIT FOR POWER SUPPLYING

(75) Inventors: Hsuan-Chuan Chen, Hsinchu (TW); Teng-Tsai Lin, Hsinchu (TW)

(73) Assignee: Feeling Technology Corp., Hsinchu (TW)

( * ) Notice: Subject to any disclaimer, the term of this patent is extended or adjusted under 35 U.S.C. 154(b) by 380 days.

(21) Appl. No.: 12/603,793

(22) Filed: Oct. 22, 2009

(65) Prior Publication Data
US 2011/0022858 A1    Jan. 27, 2011

(30) Foreign Application Priority Data
Jul. 23, 2009   (TW) ............................... 98124870 A

(51) Int. Cl.
    *H02M 3/335*   (2006.01)
(52) U.S. Cl. ...................................... 363/17; 363/56.05
(58) Field of Classification Search .................... 363/17, 363/56.05, 132
See application file for complete search history.

(56) References Cited

U.S. PATENT DOCUMENTS

| 4,047,081 A | * | 9/1977 | Liska ........................ 318/400.01 |
| 4,099,225 A | * | 7/1978 | Nygaard ..................... 363/56.03 |
| 4,516,912 A | * | 5/1985 | Leitgeb et al. .................. 417/45 |
| 5,350,994 A | * | 9/1994 | Kinoshita et al. ............. 320/116 |
| 6,262,896 B1 | * | 7/2001 | Stancu et al. ................... 363/17 |
| 6,617,820 B2 | * | 9/2003 | Carlson et al. ................ 318/727 |
| 6,687,136 B2 | * | 2/2004 | Morimoto et al. .............. 363/17 |
| 7,411,802 B2 | * | 8/2008 | Victor et al. ................... 363/132 |

* cited by examiner

*Primary Examiner* — Shawn Riley
(74) *Attorney, Agent, or Firm* — Rosenberg, Klein & Lee

(57) ABSTRACT

The control circuit for power supplying includes a driving module and a control module, wherein the driving module includes a first switch, a second switch, a third switch, and a fourth switch. In a first power supply mode, the first switch and the second switch are turned on, and the third switch and the fourth switch are turned off. The load current flows to the ground terminal via the first switch, the inductive load, and the second switch. When the control module sends a switching signal to the driving module, the first switch and the second switch are turned off and the third switch and the fourth switch are turned on, and the load current flows to the high potential terminal via the fourth switch, the inductive load, and the third switch due to the current inertia.

12 Claims, 6 Drawing Sheets

CONTROL CIRCUIT FOR POWER SUPPLYING

This application claims the benefit of Taiwan Patent Application Serial No. 098124870, filed Jul. 23, 2009, the subject matter of which is incorporated herein by reference.

FIELD OF THE INVENTION

The present invention relates to a control circuit, and particularly relates to a control circuit for power supplying.

BACKGROUND OF THE INVENTION

In the computer industry, heat dissipation is one of those problems that need to be resolved urgently, especially in chasing a new computer species with a higher computation speed, an extended operation volume and less space occupation.

The most popular heat dissipation device for computer hardware is the cooling fan, which can draw out massively the interior hot air of the computer. In the art, a fan controller is used to monitor and record operations of the fan. In the case that a temporary power shutdown hits the computer, most of operational data recorded in the fan controller would be erased simultaneously. After the power is resumed, the fan controller as in an initial state needs to re-detect and record the necessary reference data. Such a move will delay the steady-state operation of the computer and the fan.

In order to solve the aforesaid problem that the fan would stop immediately after the main power supply is cut off, a backup power supply is usually introduced to provide backup power for the fan to keep operating.

It is well known that the backup power supply in the computer system usually provides temporary backup power for the fan. If the main power supply is cut off for a longer period of time, the controller of the fan would eventually meet an electricity shutdown and thus cannot keep the recorded reference data anymore.

It would be a resolution to the foregoing difficulty in keeping the operational records in the fan controller by extending the operation of the backup power supply. Yet, such a resort of prolonging the service of the backup power after the main power supply is down may cost a lot in introducing necessary circuiting in the manufacturing stage. However, a smaller, i.e. the current, backup power supply though costs less, but can only provide limited minutes to survive the recorded reference data in the fan controller, and thus the aforesaid situation of losing data in fan controller remains.

SUMMARY OF THE INVENTION

Accordingly, it is an object of the present invention to provide a control circuit for power supplying having a inductance driving module. In the case that a power supply module of the concerned computer system is cut off, in accordance with the current inertial characteristic of the inductors, the direction of the load current can be changed by switching the switches of the driving module to form different loops and thus provide power for the control module.

It is another object of the present invention to provide a control circuit for power supplying which electrically connects a power supply module to provide a load current to an inductive load. The control circuit for power supplying includes a driving module and a control module, wherein the driving module further includes a first switch, a second switch, a third switch, and a fourth switch. In a first power supply mode, the first switch and the second switch are turned on, while the third switch and the fourth switch are turned off. The load current flows to a ground terminal via the first switch, the inductive load, and the second switch. When the control module sends a switching signal to the driving module, the first switch and the second switch are turned off, while the third switch and the fourth switch are turned on. Then, the load current flows to a high potential terminal via the fourth switch, the inductive load, and the third switch due to the current inertia.

In a preferred embodiment of the present invention, each of the first, second, third, and fourth switches can be a Metal-Oxide Semiconductor (MOS).

In another embodiment of the present invention, the control module includes a voltage comparison unit which compares the voltage value of a high potential terminal with a first reference voltage value. A switching signal is generated and then sent to the driving module according to the comparison result.

In a further embodiment of the present invention, the control circuit for power supplying further includes a charge/discharge module which is electrically connected between the high potential terminal and the ground terminal, and is in a parallel connection with the power supply module, the driving module and the control module.

By providing the control circuit for power supply of the present invention, when the main power supply is cut off, a backup power for the control module can be provided to extend the time for the control module to keep its recorded reference data, even that the system having the control circuit does not build in an expensive backup power supply.

The accompanying drawings are included to provide a further understanding of the present invention, are incorporated in and constitute a part of this specification. The drawings illustrate embodiments of the invention and, together with the description, serve to explain the principles of the present invention.

DETAILED DESCRIPTION OF THE PREFERRED EMBODIMENTS

The present invention relates to a control circuit for power supplying. The following embodiments are included to provide a further understanding to the present invention. Persons having ordinary skill in the art should know the embodiments are for better explanation of the present invention and are not for limiting the present invention. Preferable embodiments of the present invention are as below.

Figure 1:
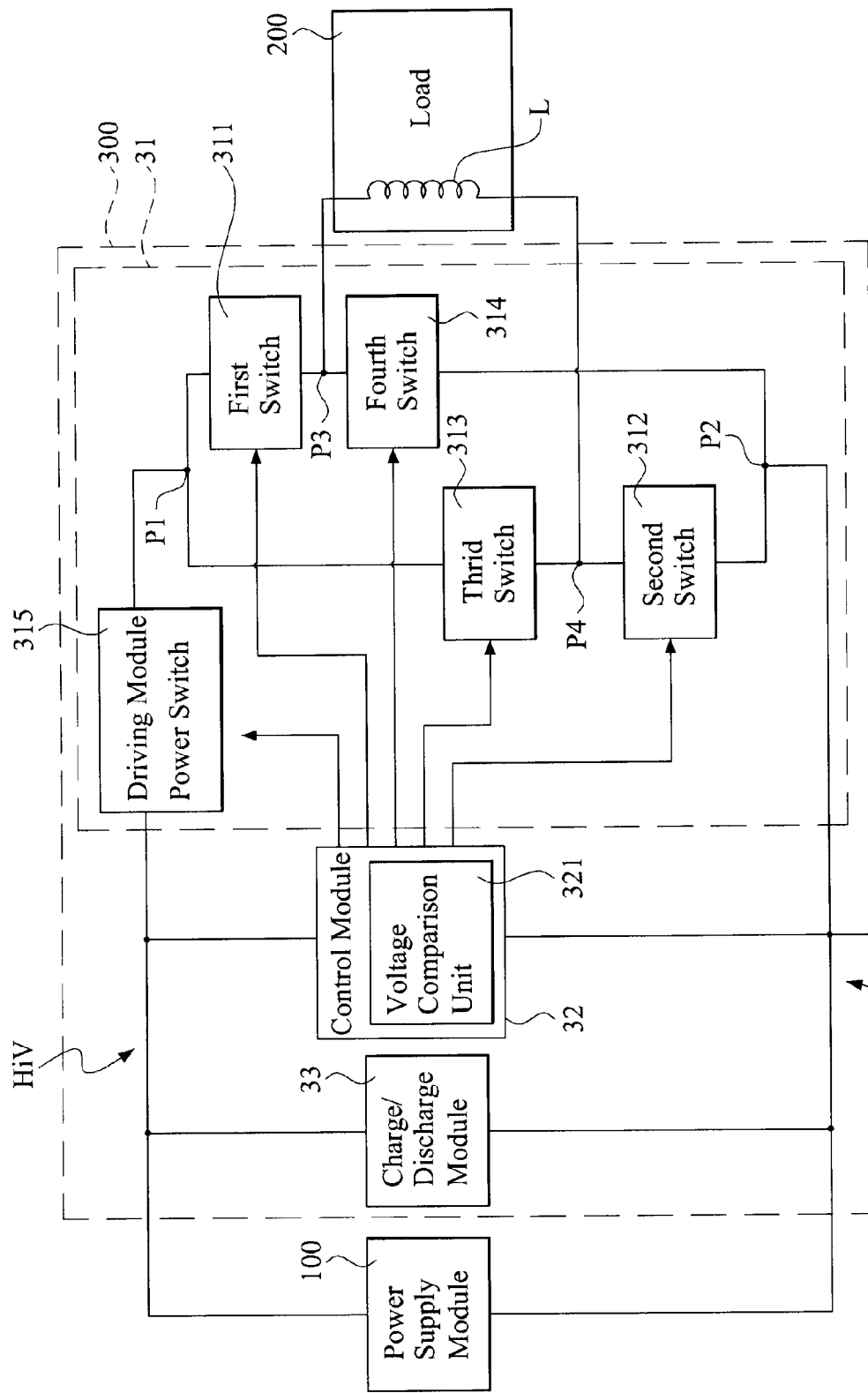
FIG. 1 is a logic block diagram of a control circuit for power supplying of the present invention.

Referring to FIG. 1, a logic block diagram of a preferred embodiment of the control circuit for power supplying in accordance with the present invention is shown. The control circuit for power supplying 300 electrically connects a power supply module 100 and a driven load 200 to provide a load current to an inductive load L of the driven load 200. The control circuit for power supplying 300 includes a driving module 31 and a control module 32.

The driving module 31 has a first end point P1, a second end point P2, a third end point P3, and a fourth end point P4. The first end point P1 electrically connects to a high potential terminal HiV of the power supply module 100, the second end point P2 electrically connects to a ground terminal Gnd, and the third end point P3 and the fourth end point P4 electrically connect to two ends of the inductive load L, respectively. In addition, the driving module 31 further includes a first switch 311, a second switch 312, a third switch 313, and a fourth switch 314.

The first switch 311 is electrically connected between the first end point P1 and the third end point P3; the second switch 312 is electrically connected between the second end point P2 and the fourth end point P4; the third switch 313 is electrically connected between the first end point P1 and the fourth end point P4; and, the fourth switch 314 is electrically connected between the second end point P2 and the third end point P3.

The afore-mentioned control module 32 electrically connects the high potential terminal HiV, the ground terminal Gnd and the driving module 31. As shown, the control module 32 signally connects individually with the first switch 311, the second switch 312, the third switch 313, and the fourth switch 314, so as able to control the first switch 311, the second switch 312, the third switch 313, and the fourth switch 314.

Furthermore, the control module 32 includes a voltage comparison unit 321 with a predetermined first reference voltage value for the voltage comparison unit 321 to compare with a voltage at the high potential terminal HiV and thereby to generate a comparison result. The control module 32 then sends a switching signal to the driving module 31 (practically, the driving module power switch 315 as shown) by judging the comparison result.

In addition, the control circuit 300 can further include a charge/discharge module 33 electrically connected between the high potential terminal HiV and the ground terminal Gnd, in a parallel manner with each of the power supply module 100, the driving module 31, and the control module 32.

Furthermore, the control circuit 300 further includes a driving module power switch 315 electrically connected between the high potential terminal HiV and the first end point P1 of the driving module 31, and also signally connected with and controlled by the control module 32. With the comparison result generated by the voltage comparison unit 321, the control module 32 sends a respective switching signal to the driving module power switch 315 so as to switch the driving module power switch 315 for disconnecting/connecting the driving module 31 to the power supply module 100 as well as the control module 32.

Figure 2A:
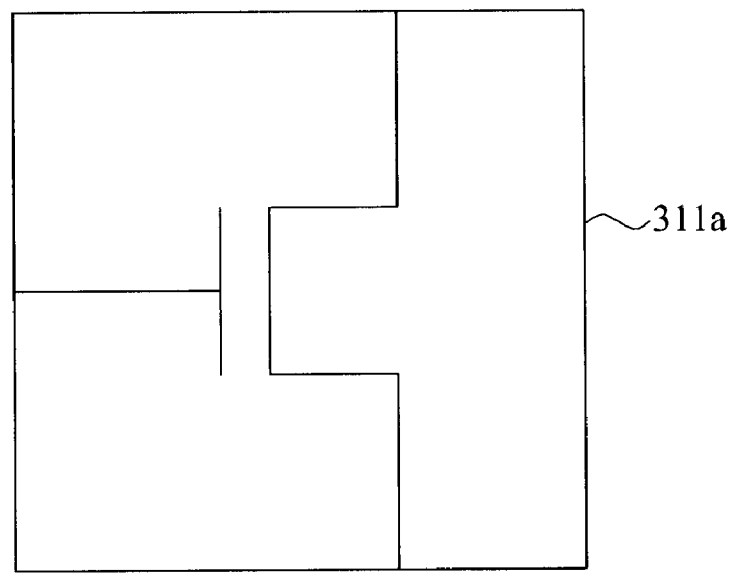
FIG. 2A shows an embodiment of a first switch in accordance with the present invention.
Figure 2B:
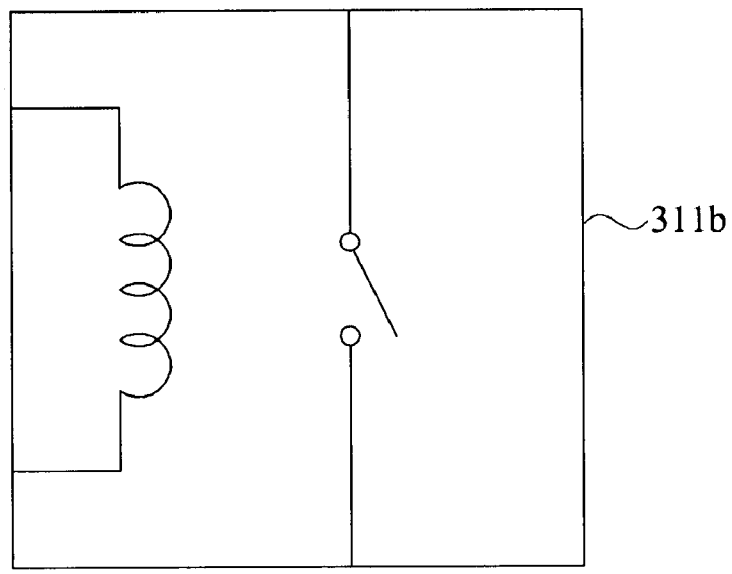
FIG. 2B shows another embodiment of the first switch in accordance with the present invention.

Refer to FIG. 2A and FIG. 2B, in which two possible embodiments for the first switch 311 is respectively shown by labeling 311a and 311b. As shown in FIG. 2A, the first switch 311a can be an N-type or a P-type Metal-Oxide Semiconductor (MOS). Alternatively, as shown in FIG. 2B, the first switch 311b can be also a relay. Similar to the first switch 311, the second switch 312, the third switch 313, the fourth switch 314 and the driving module power switch 315 can also be selected from the group of a MOS and a relay, as depicted in FIG. 2A and FIG. 2B.

Figure 3:
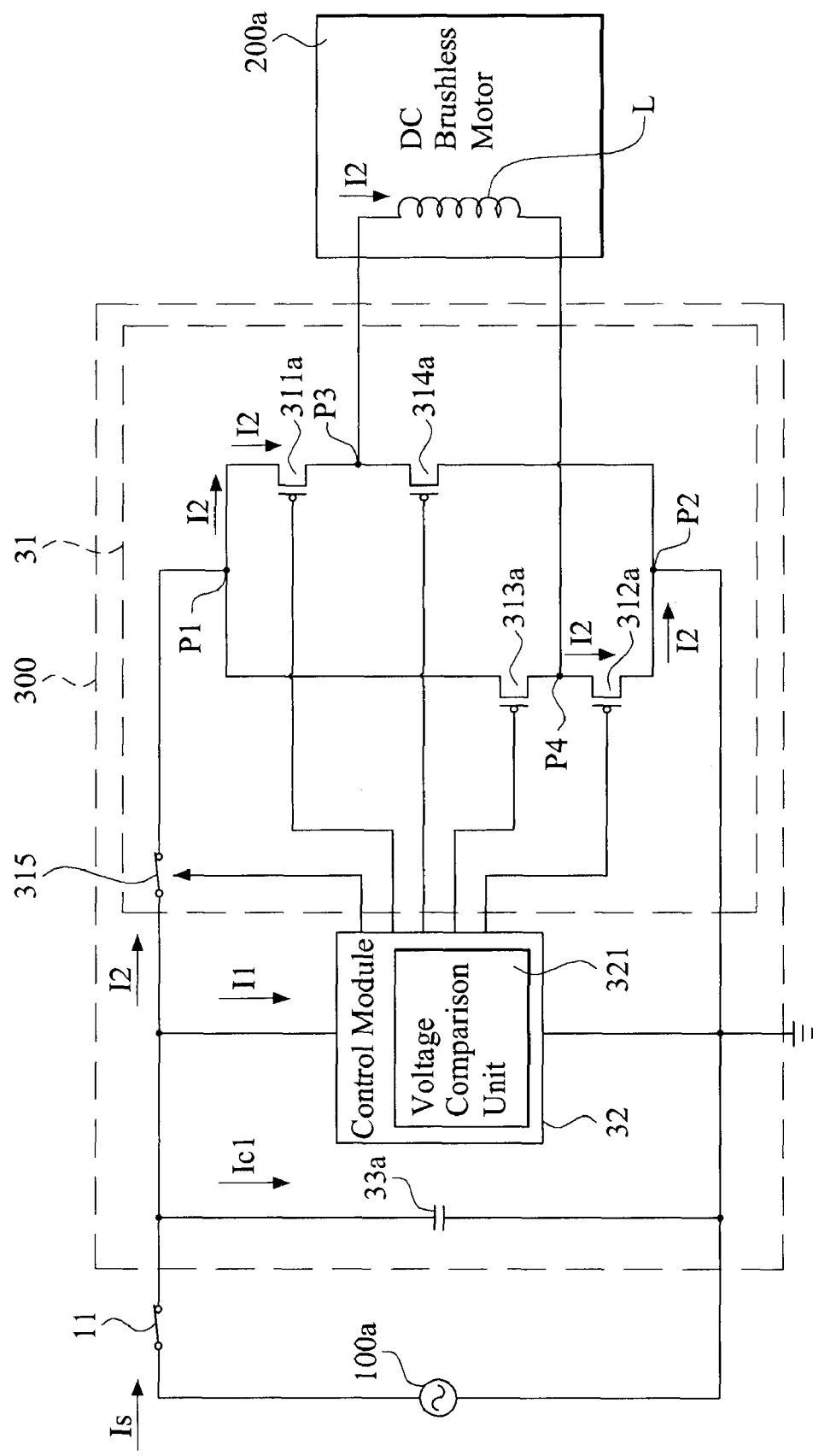
FIG. 3 is a schematic view of a first application state of FIG. 1.

Refer to FIG. 3, a schematic view of a first application state of FIG. 1. As shown, each of the first switch 311a, the second switch 312a, the third switch 313a and the fourth switch 314a is embodied as a MOS. The charge/discharge module 33a is embodied as a capacitor. The power supply module 100 is a direct current (DC) power supplier that includes a power supply switch 11. A load 200a includes the inductive load L. Furthermore, the load 200a can be a DC brushless motor.

When the power supply switch 11 is turned on, the power supply module 100a supplies a main current Is which is further bifurcated into a charge/discharge module current Ic1, a control module current I1, and a load current I2 to respectively flow into the charge/discharge module 33a, the control module 32 and the driving module 31. The driving module 31 is in the first power supply mode. In the first power supply mode, the first switch 311a and the second switch 312a are turned on, while the third switch 313a and the fourth switch 314a are turned off. The load current I2 flows to the ground terminal via the first end point P1, the first switch 311a, the third end point P3, the inductive load L, the fourth end point P4, the second switch 312a, and the second end point P2.

Figure 4:
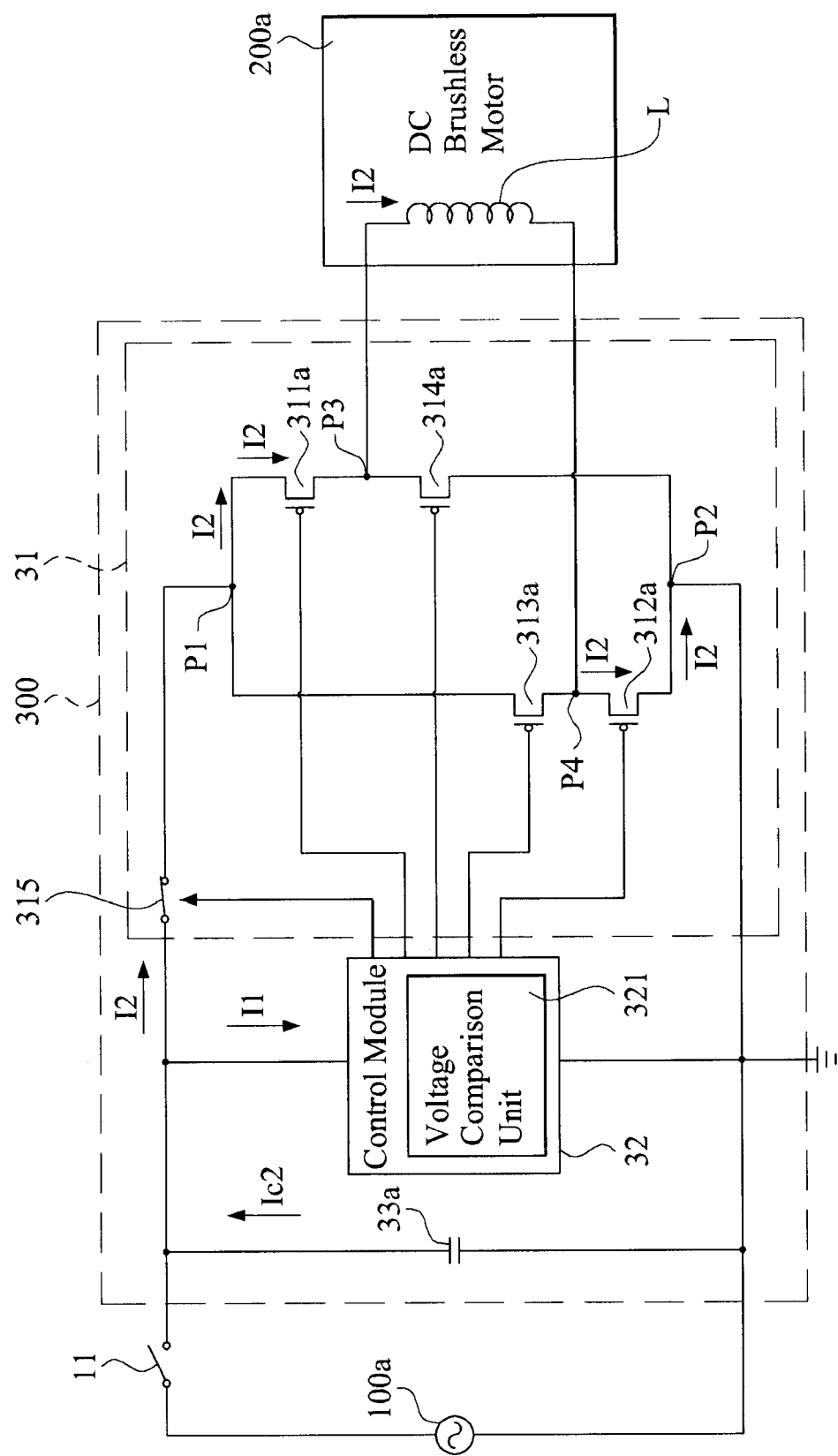
FIG. 4 is a schematic view of a second application state of FIG. 1.

Refer to FIG. 4, which shows a schematic view of a second application state of FIG. 1. In fact, the second application state herein is a power-off state right after the aforesaid first application state. When the power supply switch 11 is turned off and the power supply module 100a stops supplying power to the control circuit 300, the charge/discharge module 33a starts to release charge/discharge module current Ic2 which is further bifurcated into the control module current I1 and load current I2 to respectively flow into the control module 32 and the driving module 31. The driving module 31 is also in the first power supply mode which has the first switch 311a and the second switch 312a on, but the third switch 313a and the fourth switch 314a off. Also, the load current I2 flows to the ground terminal via the first end point P1, the first switch 311a, the third end point P3, the inductive load L, the fourth end point P4, the second switch 312a, and the second end point P2.

Figure 5:
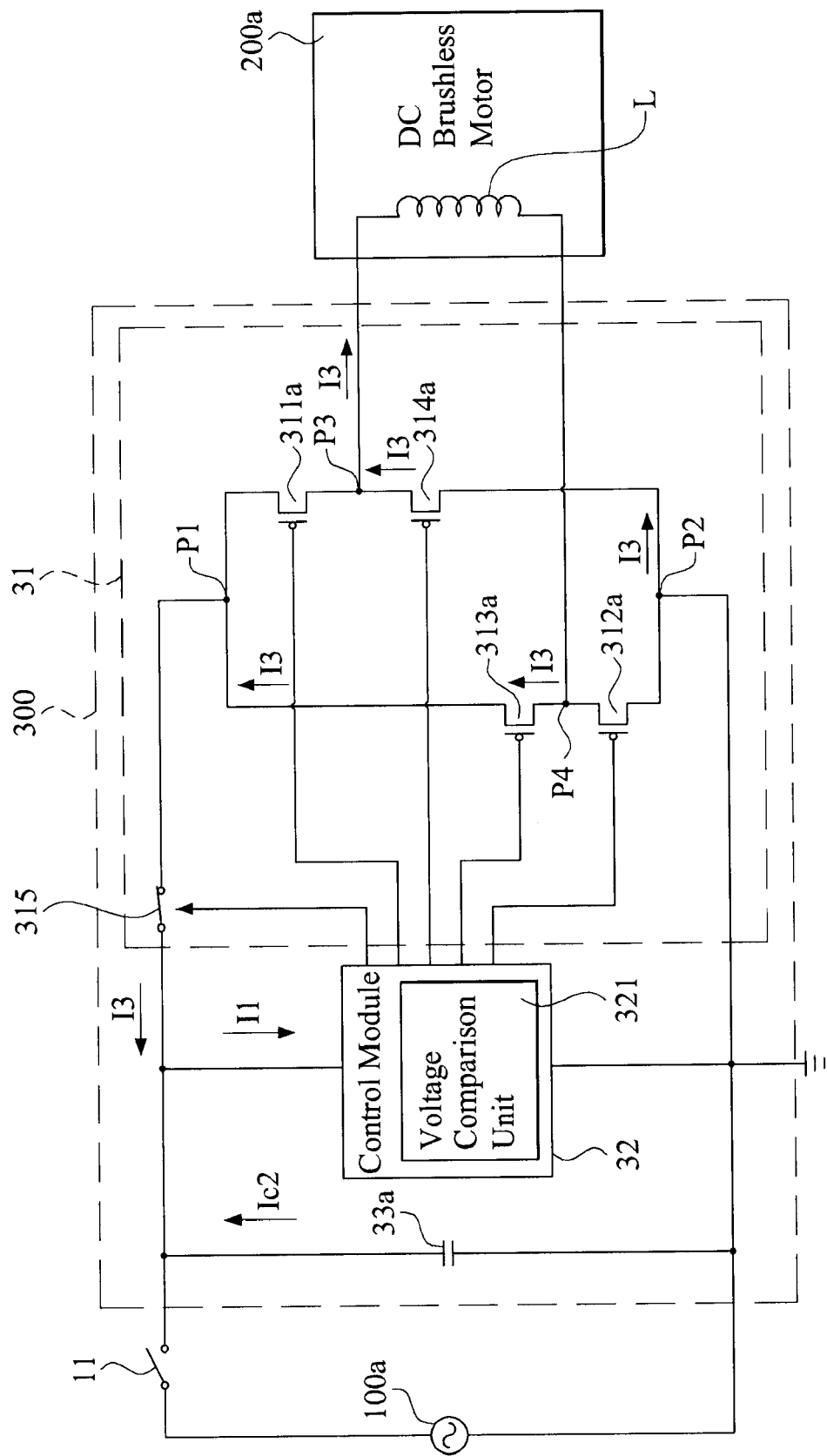
FIG. 5 is a schematic view of a third application state of FIG. 1.

Refer to FIG. 5, which shows a schematic view of a third application state of an embodiment of FIG. 1. When the voltage comparison unit 32 determines that the voltage value of the high potential terminal is lower than the predetermined first reference voltage value, the control module 32 sends switching signals to each of the first switch 311a, the second switch 312a, the third switch 313a and the fourth switch 314a of the driving module 31, and thus the driving module 31 enters a second power supply mode.

In the second power supply mode, the first switch 311a and the second switch 312a are turned off, while the third switch 313a and the fourth switch 314a are turned on. Now, since the current flowing through the inductive load L has the inertial effect, the load current I3 flows to the high potential terminal via the second end point P2, the fourth switch 314a, the third end point P3, the inductive load L, the fourth end point P4, the third switch 313a, and the first end point P1. Therefore, the load current I3 and the charge/discharge module current Ic2 are converged as the control module current I1 and flow to the control module 32.

Figure 6:
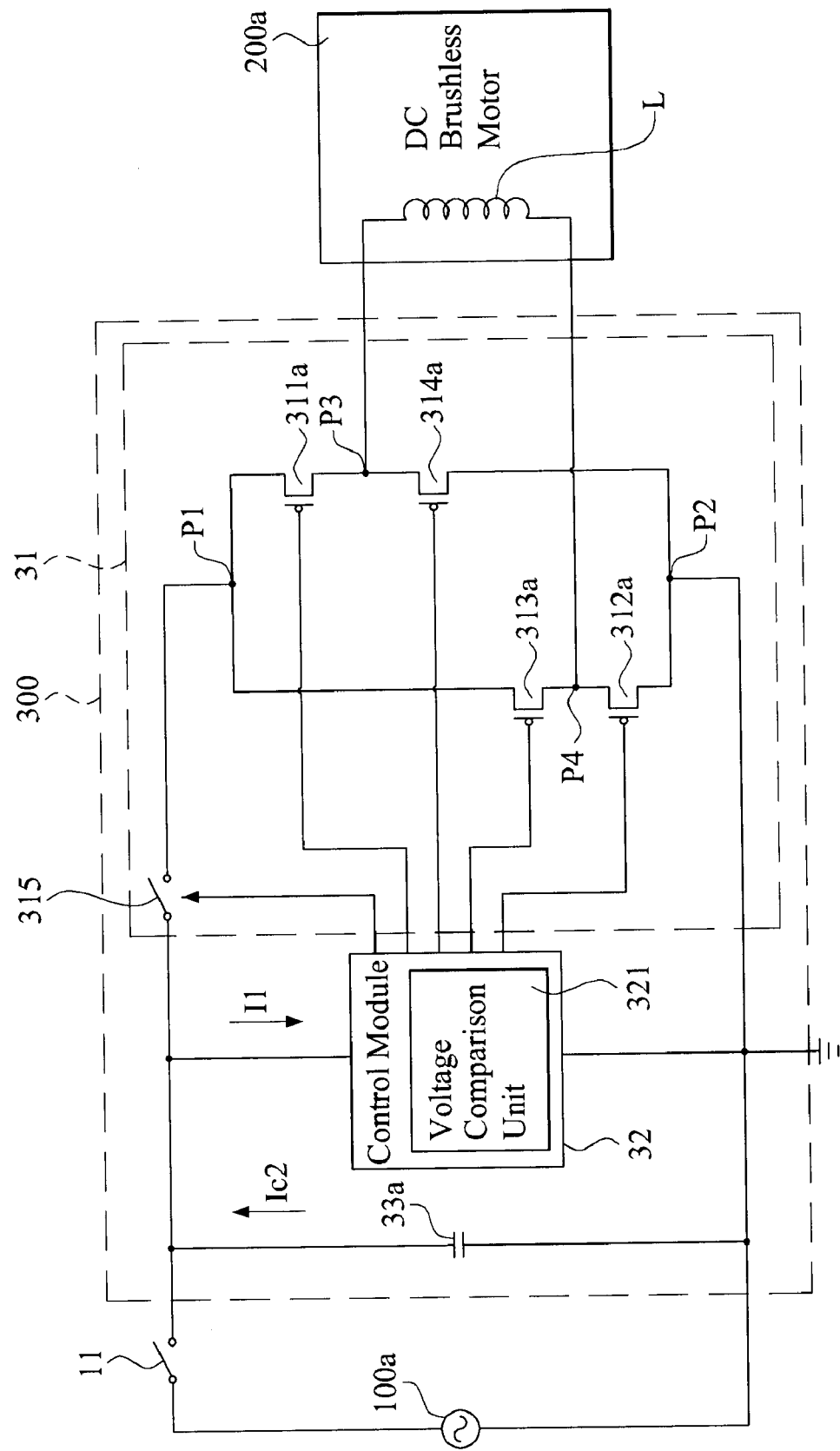
FIG. 6 is a schematic view of a fourth application state of FIG. 1.

Refer now to FIG. 6, which is a schematic view of a fourth application state of an embodiment of the present invention. When the voltage comparison unit 321 judges that the voltage value of the high potential terminal is lower than the predetermined second reference voltage value, the control module 32 sends another power switching signal to the driving module power switch 315.

When the driving module power switch 315 receives the power switching signal, the driving module power switch 315 enters an open state so that the driving module 31 is disconnected from the power supply module 100a, charge/discharge module 33a, and the control module 32. Simultaneously, the charge/discharge module 33a releases the charge/discharge module current Ic2 to form the control module current I1 flowing through the control module 32.

In this invention, upon a power-off state of the power supply module 100, the control circuit for power supplying 300 uses the current inertial characteristic of the inductive load L in the driving module 31, switches the switches in the driving module so as to establish different loops and further to change the directions of the load current, and thus provide a temporary power supplying path for the control module 32.

Besides, the control circuit for power supplying 300 of the present invention can further include the charge/discharge module 33. Thereby, when the power supply module 100 stops providing power, the charge/discharge module 33 can come to work for providing temporary power for the control module 32.

Furthermore, the control circuit for power supplying 300 can further include the driving module power switch 315. Thereby, when the power supply module 100 stops providing power, the driving module power switch 315 can be turned off in time to disconnect the driving module 31 from the power supply module 100, the charge/discharge module 33, and the control module 32 so as to avoid the driving module power switch 315 to consume backup power and thus to prevent from immediate power shortage in the control module 32.

Accordingly, compared with the conventional circuit for power supplying, the present invention can change the directions of the load current by switching the switches of the driving module while the power supply module 100 in meeting a power shutdown, and can further use the driving module 31 as another power supply. In other words, the present invention can provide backup power for the control module 32 of the control circuit for power supplying 300 without an additional expense in backup power supply, so that the time for the control module 32 to record reference data can be extended.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A control circuit for power supplying, electrically connecting a power supply module to provide a load current in a first direction to an inductive load, the control circuit for power supplying comprising:
a driving module having a first end point, a second end point, a third end point, and a fourth end point, the first end point electrically connecting to a high potential terminal of the power supply module, the second end point electrically connecting to a ground terminal, the third end point and the fourth end point electrically connecting to two ends of the inductive load respectively, the driving module further comprising a plurality of switches:
a first switch of the plurality of switches electrically connected between the first end point and the third end point;
a second switch of the plurality of switches electrically connected between the second end point and the fourth end point;
a third switch of the plurality of switches electrically connected between the first end point and the fourth end point; and
a fourth switch of the plurality of switches electrically connected between the second end point and the third end point; and
a control module electrically connecting the high potential terminal, the ground terminal and the driving module, wherein in a first power supply mode that the first switch and the second switch are turned on and the third switch and the fourth switch are turned off, the load current flows to the ground terminal via the first end point, the first switch, the third end point, the inductive load, the fourth end point, the second switch, and the second end point; and, while in the first power supply mode, upon when the control module sends a switching signal to the driving module, the first switch and the second switch are turned off and the third switch and the fourth switch are turned on, and the load current flows to the high potential terminal via the second end point, the fourth switch, the third end point, the inductive load, the fourth end point, the third switch and the first end point;
wherein when the power supply module is in a powered-off state, the control circuit for power supplying utilizes the inertia characteristics of the inductive load and switch the plurality of switches to change the first direction of the load current to a second direction to provide a different power supplying path to the control module.

2. The control circuit for power supplying of claim 1, wherein the first switch is selected from the group of a Metal-Oxide Semiconductor and a relay.

3. The control circuit for power supplying of claim 1, wherein the second switch is selected from the group of a Metal-Oxide Semiconductor and a relay.

4. The control circuit for power supplying of claim 1, wherein the third switch is selected from the group of a Metal-Oxide Semiconductor and a relay.

5. The control circuit for power supplying of claim 1, wherein the fourth switch is selected from the group of a Metal-Oxide Semiconductor and a relay.

6. The control circuit for power supplying of claim 1, wherein the control module electrically connects individually with the first switch, the second switch, the third switch, and the fourth switch.

7. The control circuit for power supplying of claim 1, further comprising a charge/discharge module electrically connected between the high potential terminal and the ground terminal, in a parallel manner with each of the power supply module, the driving module, and the control module.

8. The control circuit for power supplying of claim 7, wherein the charge/discharge module is a capacitor.

9. The control circuit for power supplying of claim 1, wherein the control module comprises a voltage comparison unit with a predetermined first reference voltage value for the voltage comparison unit to compare with a voltage at the high potential terminal and thereby to generate a comparison result, the control module sends the switching signal to the driving module by judging the comparison result.

10. The control circuit for power supplying of claim 1, further comprising a driving module power switch electrically connected between the high potential terminal and the driving module, and also electrically connected with and controlled by the control module.

11. The control circuit for power supplying of claim 10, wherein the driving module power switch is selected from the group of a Metal-Oxide Semiconductor and a relay.

12. The control circuit for power supplying of claim 1, wherein the control module comprises a voltage comparison unit with a predetermined second reference voltage value for the voltage comparison unit to compare with a voltage at the high potential terminal and thereby to obtain a comparison result, the control module judges the comparison result to send a power switching signal to the driving module power switch so as to switch the driving module power switch and to electrically disconnect the driving module from the power supply module and the control module.

* * * * *